United States Patent [19]

Obata

[11] Patent Number: 5,801,677
[45] Date of Patent: Sep. 1, 1998

[54] SHARED DOCUMENT DISPLAY SYSTEM

[75] Inventor: Akihiko Obata, Kawasaki, Japan

[73] Assignee: Fujitsu Limited, Kawasaki, Japan

[21] Appl. No.: 602,676

[22] Filed: Feb. 16, 1996

Related U.S. Application Data

[63] Continuation of Ser. No. 247,968, May 23, 1994, abandoned.

[30] Foreign Application Priority Data

Sep. 30, 1993 [JP] Japan .................................. 5-245349

[51] Int. Cl.⁶ .................................................. G09G 5/34
[52] U.S. Cl. .................................. 345/123; 345/1
[58] Field of Search ........................ 345/1, 2, 123, 345/124, 157, 119, 120; 395/145, 153, 154, 144, 146

[56] References Cited

U.S. PATENT DOCUMENTS

| | | | |
|---|---|---|---|
| 4,734,689 | 3/1988 | Kurakake | 345/123 |
| 4,897,804 | 1/1990 | Kawakami et al. | 395/145 |
| 5,109,482 | 4/1992 | Bohrman | 395/154 |
| 5,140,676 | 8/1992 | Langelman | 395/145 |
| 5,276,796 | 1/1994 | Yamada et al. | 395/145 |
| 5,339,389 | 8/1994 | Bates et al. | 395/153 |

OTHER PUBLICATIONS

Simpson, Mastering WordPerfect 5.1 & 5.2 for Windows, 1993, pp. 30–33.

*Primary Examiner*—Chanh Nguyen
*Attorney, Agent, or Firm*—Staas & Halsey

[57] ABSTRACT

A cursor movement unit controls the movement of the cursor of a user's own terminal and the cursor of another terminal according to a cursor movement (i.e., right, left, up, down) command received by the input receiving portion of the user's own terminal or provided from the other terminal. A scrolling unit scrolls the document according to the cursor movement command, when either the user's own terminal cursor or the other terminal cursor is located within a predetermined distance from one end of the window. A notifying unit sends to the other terminal a cursor movement command received by the user's own terminal.

12 Claims, 23 Drawing Sheets

FIG. 19A

SCREEN OF USER A TERMINAL  SCREEN OF USER B TERMINAL

SCREEN OF USER A TERMINAL  SCREEN OF USER B TERMINAL

SCREEN OF USER A TERMINAL              SCREEN OF USER B TERMINAL

SCREEN OF USER A TERMINAL              SCREEN OF USER B TERMINAL

SCREEN OF USER A TERMINAL          SCREEN OF USER B TERMINAL

SCREEN OF USER A TERMINAL          SCREEN OF USER B TERMINAL

SCREEN OF USER A TERMINAL          SCREEN OF USER B TERMINAL

SCREEN OF USER A TERMINAL          SCREEN OF USER B TERMINAL

SCREEN OF USER A TERMINAL          SCREEN OF USER B TERMINAL

SCREEN OF USER A TERMINAL          SCREEN OF USER B TERMINAL

```
        45A                               45B
1 1 1 1 □ 1                        1 1 1 1 □ 1
2 2 2 2 2 2      —//—              2 2 2 2 2 2
3 3 3 ▨ 3 3                        3 3 3 ▨ 3 3
4 4 4 4 4 4                        4 4 4 4 4 4
```

SHARED DOCUMENT DISPLAY SYSTEM

This application is a continuation, of application Ser. No. 08/247,968, filed May 23, 1994, now abandoned.

BACKGROUND OF THE INVENTION

1. Field of the Invention

This invention generally relates to shared document display systems, and more particularly to a shared document display system which shows on the display of a terminal a document shared by a plurality of terminals connected to each other through communication lines.

2. Description of the Prior Art

There have been developed shared document display systems which, on terminals connected to communication lines such as ISDN (Integrated Services Digital Network), LAN (Local Area Network), etc., allow users to have a verbal communication with each other, modify the shared document on the display, and teach other users with the help of cursor indication.

In the systems described above, there is no consideration regarding how to control document scrolling which should follow cursor movement when the cursors are moved about on the display of a shared document.

Editors used for typical document editing show only part of the document on the display, and scroll the document according to the movement of the cursor. In shared document systems of the prior art, since the right to control a cursor is given to only one user at a given time, the control of cursors and document scrolling is done in the same manner as document systems for a single user.

Thus, there is a need for a shared document display system which enables each user to control his/her own cursor on the display and allows the document to scroll according to the movement of his/her own cursor as well as the coursers of other users on the display.

SUMMARY OF THE INVENTION

Accordingly, it is a general object of the present invention to provide a shared document display system which satisfies the need described above.

Another and more specific object of the present invention is to provide a shared document display system which allows a user to see on the screen of the user's own terminal a document which is also displayed on screens of a plurality of communication terminals connected to the user's own terminal, allows the user to move the user's own cursor on the document with a cursor movement command, allows another user's cursor to move on the document according to a cursor movement command received by the other user's terminal, allows the document to scroll when a cursor movement command directs a cursor to enter a predetermined proximity of an edge of the window showing the document, and allows the other user's terminal to behave in the same manner by sending to the other user's terminal a cursor movement command for the user's own cursor.

Yet another object of the present invention is to provide the shared document display system described above which further makes the position of one of the two cursors follow the scrolling of the document which is caused by a cursor movement command for the other cursor.

Still another object of the present invention is to provide the shared document display system which further allows users to move cursors around by dividing the window, e.g. horizontally or vertically, into divided windows arranged along a scrolling direction when a cursor following the document scrolled by a cursor movement command for the other cursor enters a predetermined proximity of an edge of the window.

A further object of the present invention is to provide the shared document display system which further merges the divided windows when a cursor movement command directs either one of the two cursors to the boundary between the divided windows, causing the scrolling of one of the divided windows to result in the joining of the two document views shown in the divided windows.

Other objects and further features of the present invention will be apparent from the following detailed description when read in conjunction with the accompanying drawings.

BRIEF DESCRIPTION OF THE DRAWINGS

FIGS. 19A and 19B show an example of the window on a screen display according to the present invention when a cursor movement command causes the scrolling of the window document;

FIGS. 20A and 20B show an example of the window on a screen display according to the present invention when a cursor movement command causes the division of the window;

FIGS. 21A and 21B show an example of two divided windows on a screen display according to the present invention when a cursor movement command causes the scrolling of both window documents;

FIGS. 22A and 22B show an example of two divided windows on a screen display according to the present invention when a cursor movement command causes the further division of the two windows into four; and FIGS. 23A and 23B show an example of the merging of windows on a screen display according to the present invention when a cursor movement command causes the merging of two windows into one.

DESCRIPTION OF THE PREFERRED EMBODIMENT

Figure 1:
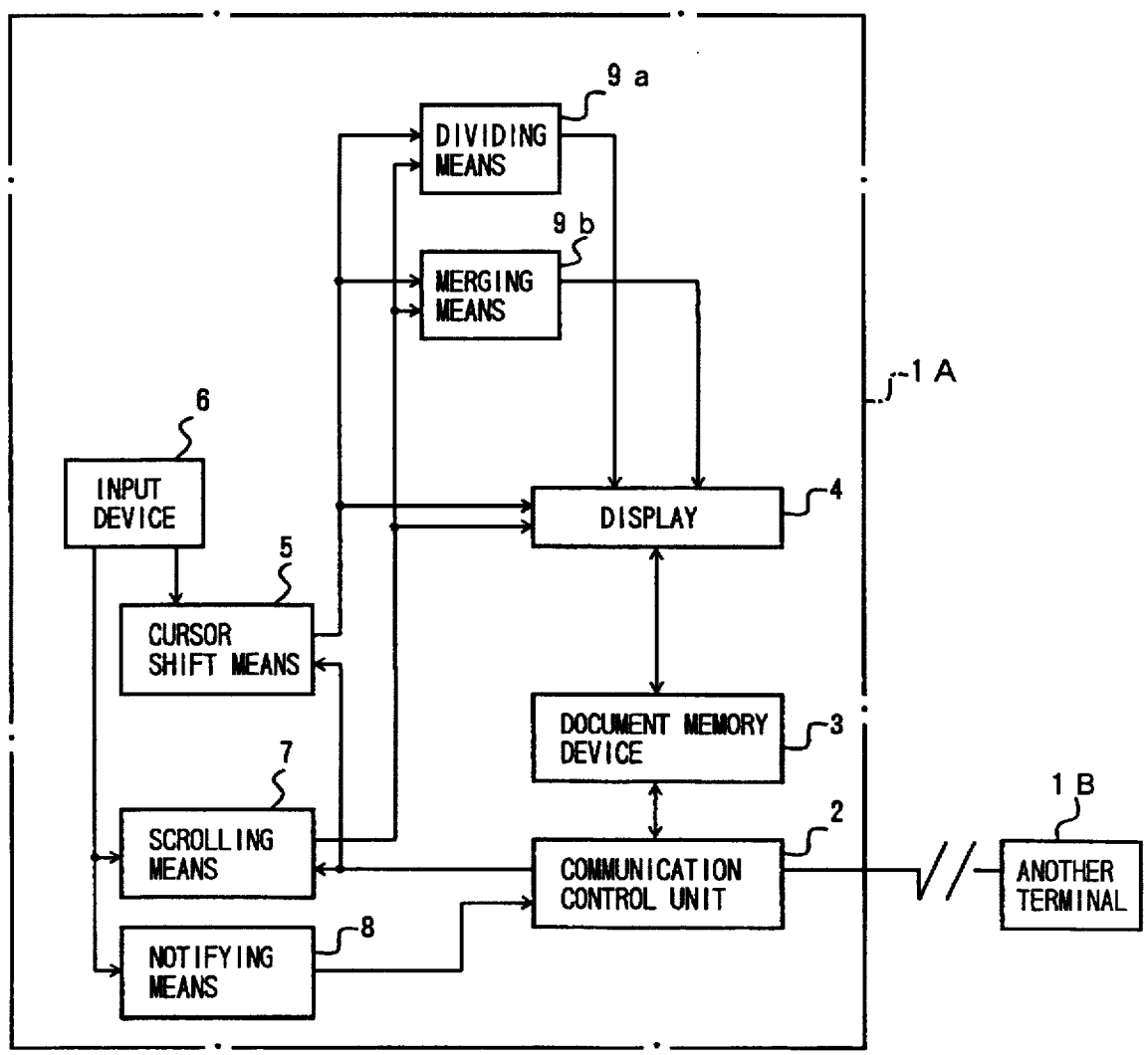
FIG. 1 is a block diagram of the present invention.

FIG. 1 shows the principle of a shared document display system according to the present invention. The shared document display system implemented on a terminal 1A according to the present invention comprises a communication control unit 2 which is connected to another communication control unit of another terminal 1B, a document memory device 3 for storing shared documents, a display 4 on which a shared document retrieved from the document memory device 3 is shown, an input device 6 for receiving cursor movement commands giving a cursor movement direction, such as up, down, left, and right, for the cursor of the system's own terminal 1A, a cursor movement means 5 for controlling the movement of two cursors on the display 4, one cursor for the system's own terminal 1A and the other for the other terminal 1B, according to the corresponding cursor movement command provided from the input device 6 or from the other terminal 1B, a scrolling means 7 for scrolling the document in response to the cursor movement command when the distance between the edge of the window and one of the two cursors is shorter than a predetermined length, and a notifying means 8 which transfers the cursor movement command to the other terminal 1B.

The shared document display system further comprises a dividing means 9a which divides the window of the document vertically or horizontally in a scrolling direction when scrolling caused by a cursor movement command for one of the two cursors makes shorter than a predetermined length the distance between the other cursor and the edge of the window opposite to the end toward which the former cursor is directed. The shared document display system further comprises a merging means 9b which, under the circumstances of the existence of divided windows, merges the two divided windows when a cursor movement command directs one of the two cursors to the boundary between the two divided windows, causing the scrolling of the window to result in the joining of the two document views.

Figure 2:
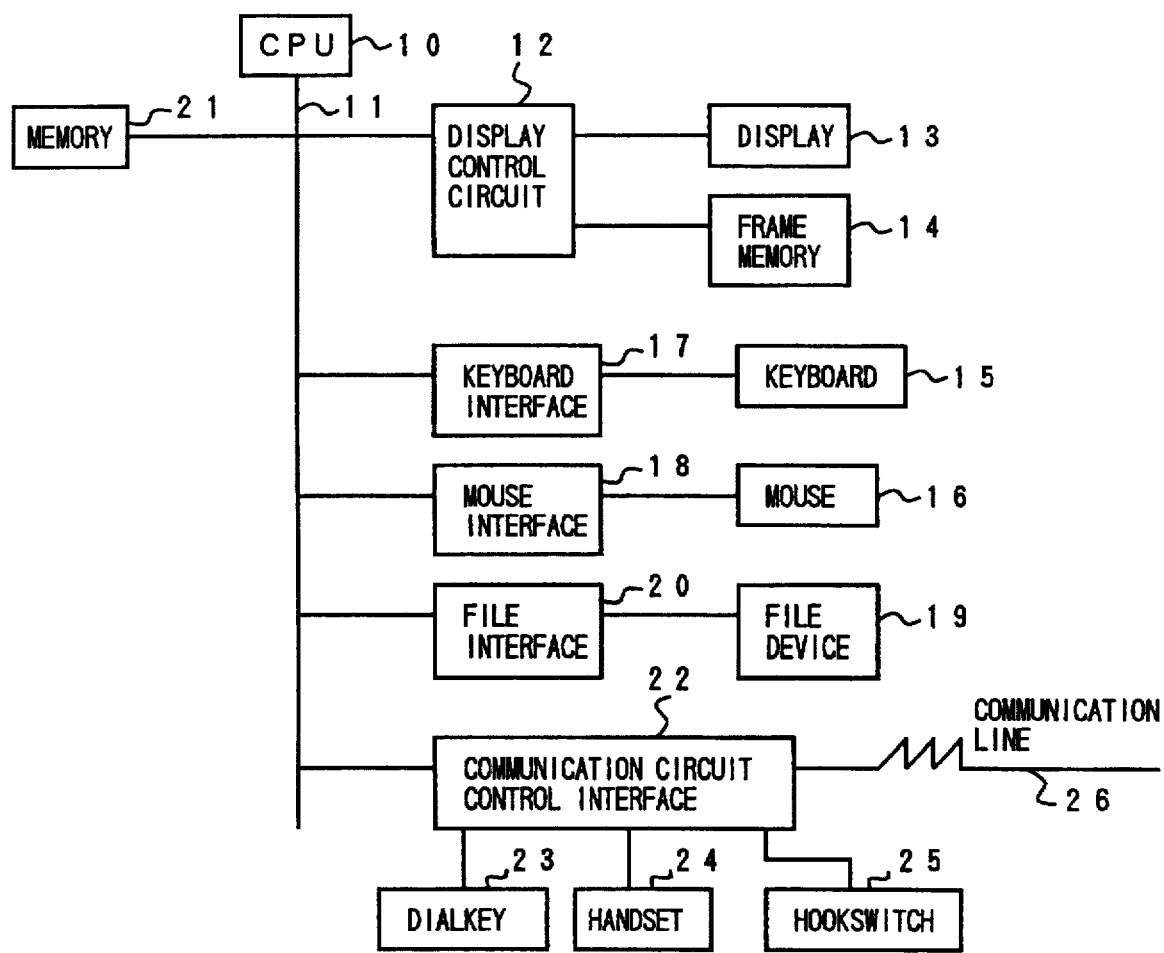
FIG. 2 is a block diagram of a communication terminal according to the present invention.

FIG. 2 is a block diagram of a terminal according to the preferred embodiment of the present invention. In FIG. 2, a CPU 10 controls the entire terminal which is connected to a BUS 11. A display 13 for showing a shared document and like, and a frame memory 14 for storing image data to be displayed are connected to a display control circuit 12 which in turn is connected to the BUS 11. A keyboard 15 for receiving character inputs and command inputs, and a mouse 16 for controlling cursor movement are connected to the BUS 11 via an interface 17 and 18, respectively. A file device 19 for storing shared documents and the like is connected to the BUS 11 via an interface 20. A memory 21 which is connected to the BUS 11 stores control programs for the CPU 10, and stores a window management table, which will be described later. A communication circuit control interface 22, which is also connected to the BUS 11, is provided with a keypad 23, a handset 26, and a hook switch 25, and serves as an interface between a communication line 26 and the BUS 11. The terminal is connected to other terminals through the communication line 26.

Figure 3:
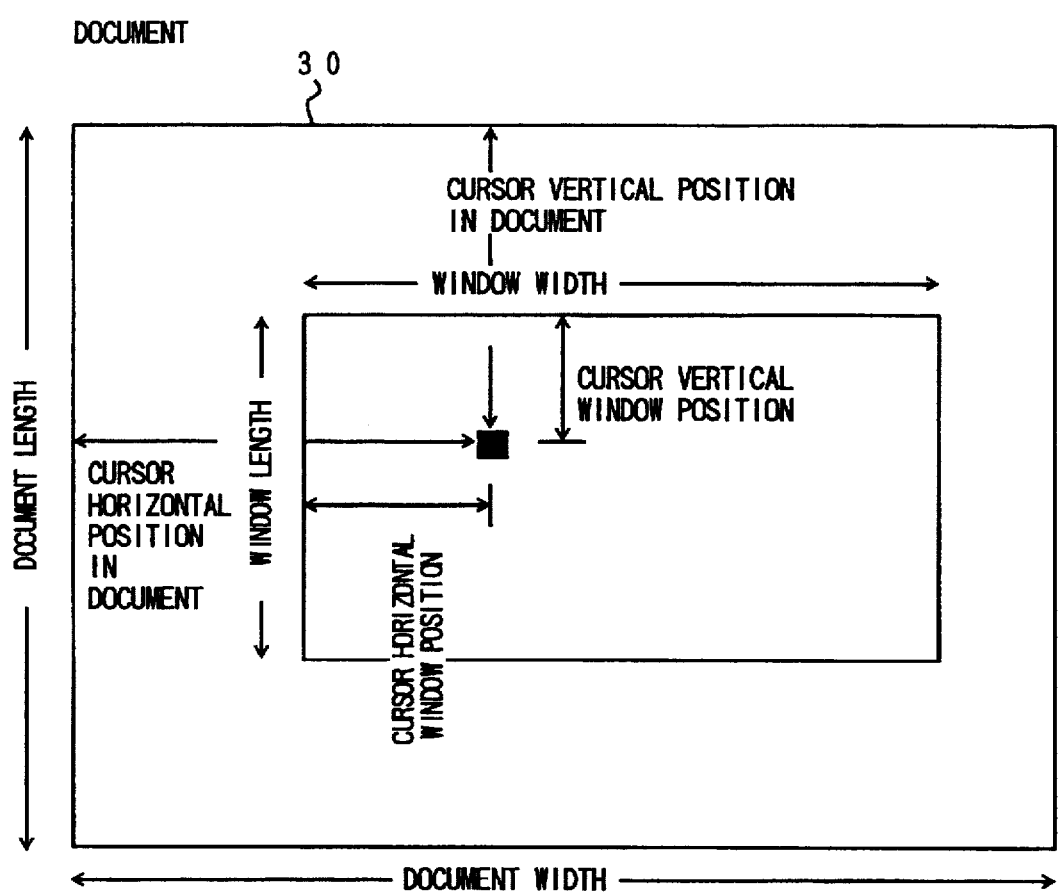
FIG. 3 is a illustrative diagram of a document and a window.

The terminal, shown in FIG. 2, shows on the display 13 a window 31 of a document 30 shown in FIG. 3. The window management table stored in a memory 21 has the following information for each numbered window: document file address, document length, document width, the amount of document vertical scrolling (=cursor vertical position in the document—cursor vertical window position), the amount of document horizontal scrolling (=cursor horizontal position in the document —cursor horizontal window position), window length, window width, the window number displaying the other cursor, the vertical window position of the system terminal cursor, the horizontal window position of the system terminal cursor, the vertical window position of the other terminal cursor, the horizontal window position of the other terminal cursor, window vertical division flag, window horizontal division flag, and the amount of vertical scrolling and the amount of horizontal scrolling of the first to the fourth divided windows. The term 'system terminal cursor' means the cursor which is controlled by the system's own terminal. The term 'other terminal cursor' means a cursor which is controlled by another terminal connected to the system terminal. The first to fourth divided windows are windows at the upper left, upper right, lower left, and lower right, respectively.

FIGS. 4 to 10 are flow charts of the process carried out by display control circuit 12 when a cursor moves downward. This process is carried out when a command for moving down the system terminal cursor is received through mouse 16 or either the return key or the cursor downward movement key on the keyboard 15, or when a cursor downward movement command for the other terminal cursor is provided through communication circuit control interface 22. This command moves a cursor down by one vertical unit.

Figure 4:
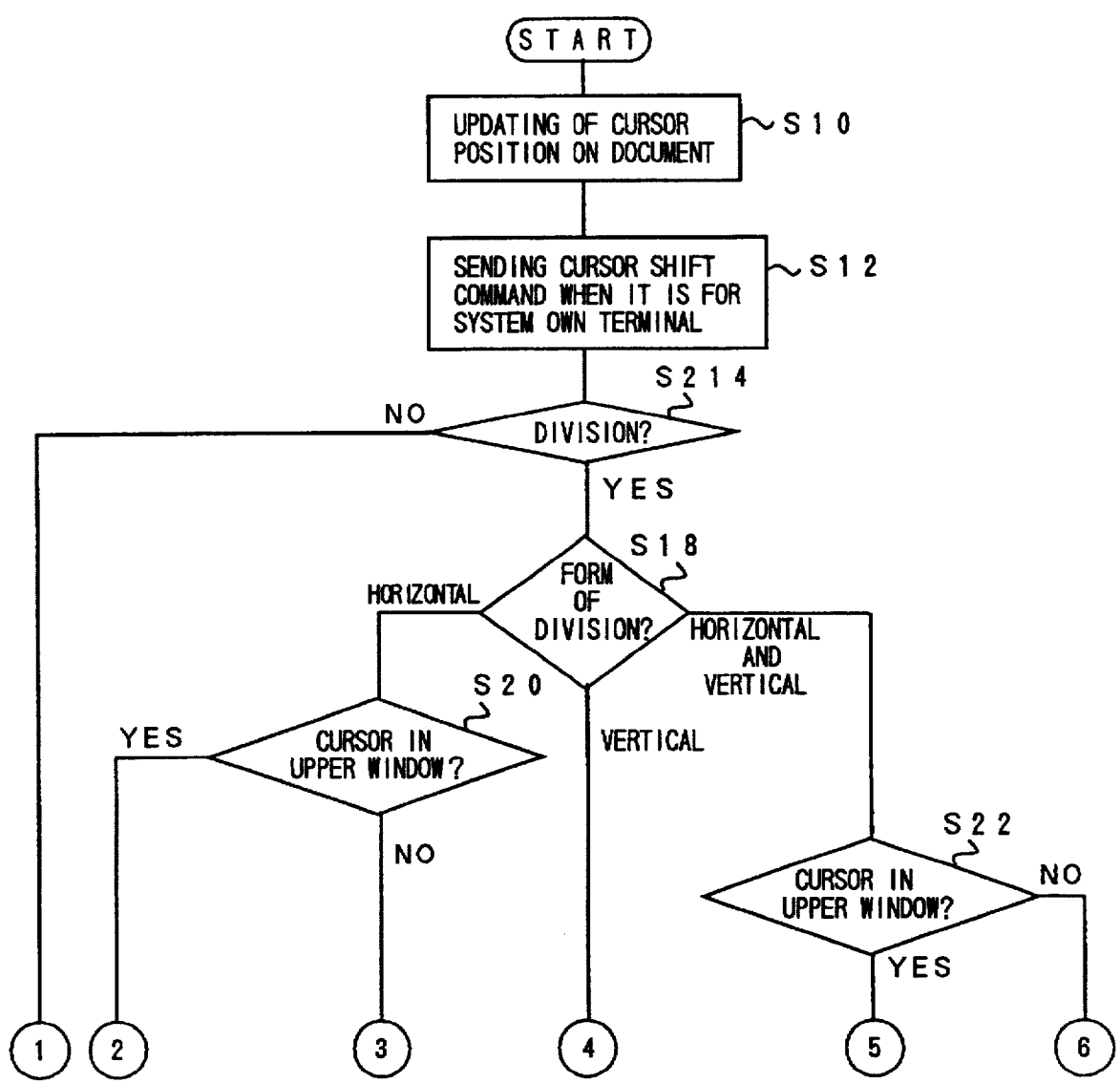
FIGS. 4, 5, 6, 7, 8, 9, and 10 are flow charts of a cursor down movement process according to the preferred embodiment of the present invention.

In FIG. 4, the position in the document of either the system terminal cursor or the other terminal cursor, depending on the given command, is updated at step S10. At step 12, the cursor movement command is sent to the other terminal through communication circuit control interface 22, only when the cursor movement command is for the system terminal cursor.

At the following steps, S14 and S18, the existence of divided windows is determined. If there is no division, the process in FIG. 5 follows, and if the window is divided horizontally into two, whether the cursor to be moved is located in the upper window is determined at step S20. If it is in the upper window, the process in FIG. 6 ensues, and if in the lower window, the process in FIG. 7 follows. Also, if the window is divided vertically, the process in FIG. 8 follows. Furthermore, if the window is divided vertically and horizontally into four, it is determined at step S22 whether the cursor to be moved is located either in the upper left window or in the upper right window. If it is located in either of them, the process in FIG. 9 follows. If located either in the lower left or lower right window, the process in FIG. 10 follows.

Figure 5:
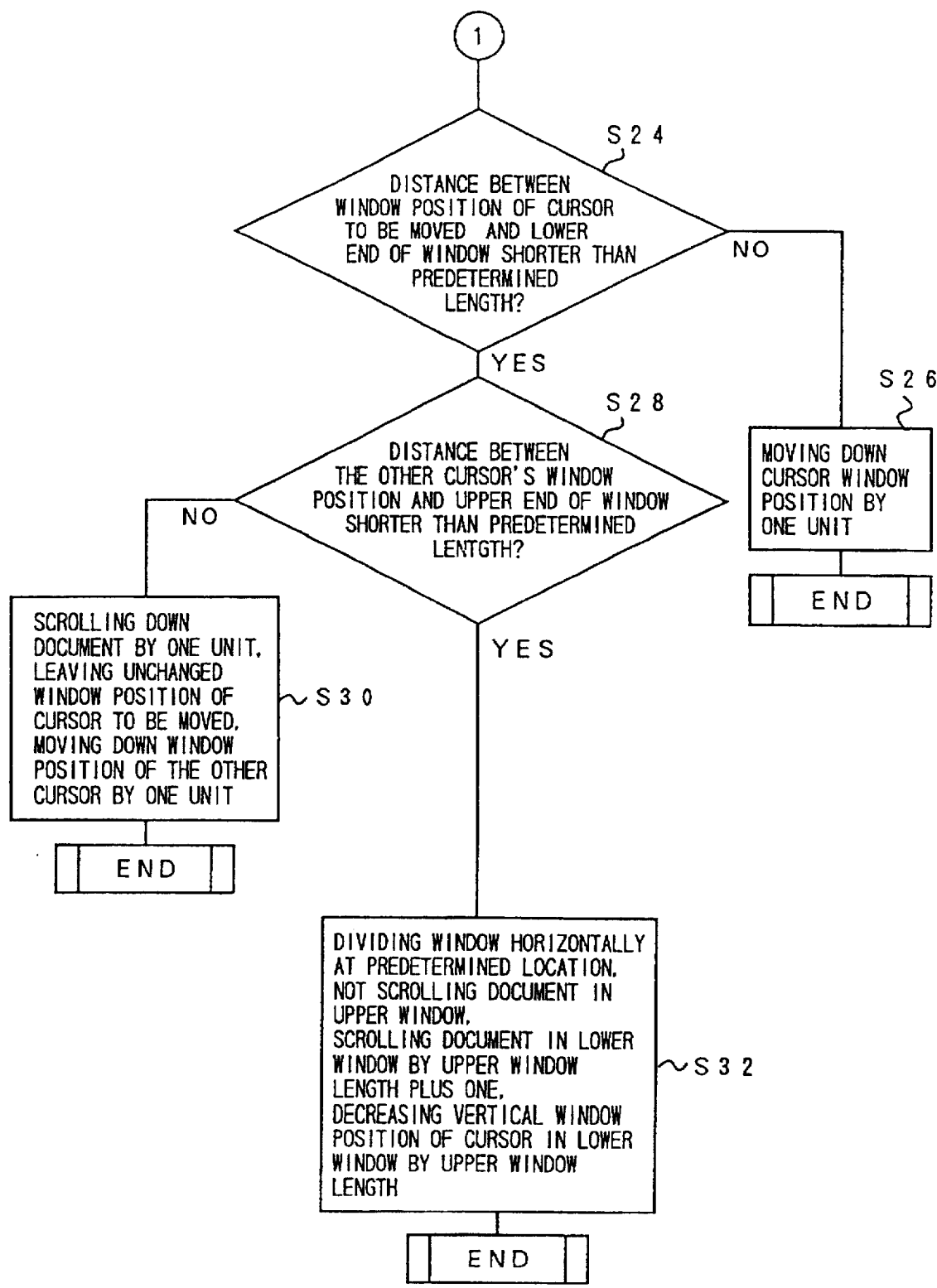

In FIG. 5, it is determined at step S24 whether the distance between the vertical window position of the cursor to be moved and the lower end of the window is shorter than a predetermined length (e.g., 1), and if it is not, the vertical window position of the cursor to be moved is now moved down at step S26 by one vertical unit. This is the end of the process. On the other hand, if it is shorter, it is determined at step S28 whether the distance between the vertical window position of the other cursor staying still and the upper end of the window is shorter than a predetermined length. If it is not, the document is scrolled down at step S30 by one vertical unit, leaving unchanged the vertical window position of the cursor to be moved. At the same time, the vertical window position of the other cursor is moved up by one vertical unit, and this is the end of the process.

If it is determined to be shorter at step S28, the window is divided horizontally at a predetermined location (e.g., the center of the window). Then, the document of the upper window is not scrolled, and the document of the lower window is scrolled by the length of the upper window plus one, which makes the document of the lower window appear to scroll by only one vertical unit. At the same time, the vertical window position of the cursor in the lower window is decreased by the length of the upper window, with the positions of both cursors on the screen being unchanged. This is the end of the process.

Figure 6:
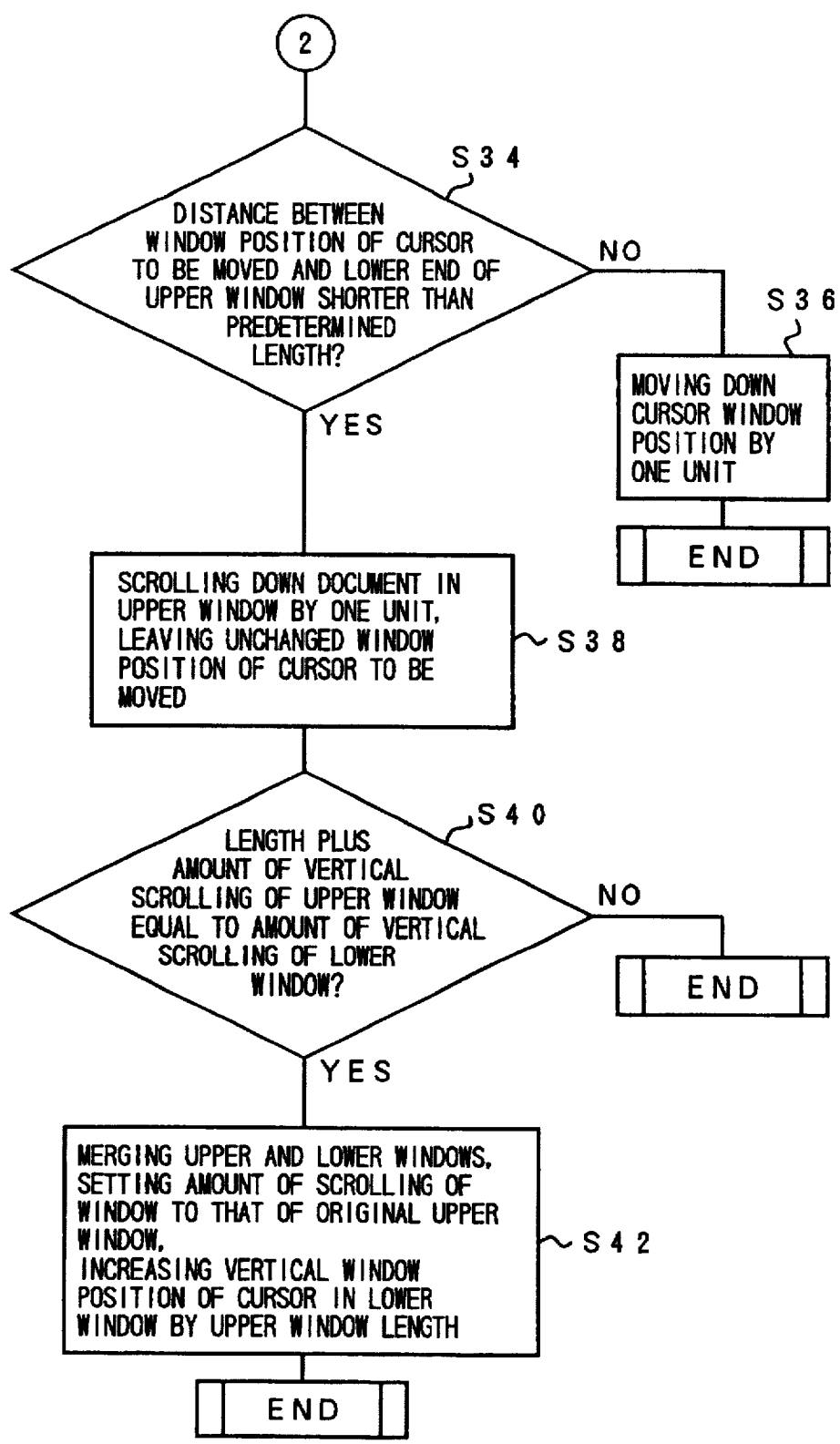

In FIG. 6, it is determined at step S34 whether the distance between the vertical window position of the cursor to be moved and the lower end of the upper window is shorter than a predetermined distance (e.g., 1). If it is not shorter, the vertical window position of the cursor is moved down at step S36 by one vertical unit, and this is the end of the process. If it is shorter, the document of the upper window is scrolled down at step S38 by one unit, leaving unchanged the vertical window position of the cursor to be moved.

Then, it is determined at step S40 whether the amount of scrolling of the lower window is equal to the length plus the amount of scrolling of the upper window, i.e., whether the documents of the upper and lower windows appear to be continuous on the screen. If it is not, this is the end of the process. If it is, the division of the window into lower and upper windows is finished at step S42. At the same time, the amount of scrolling of the merged window is set to that of the upper window, and the vertical window position of the cursor previously in the lower window is increased by the length of the upper window, with the positions on the screen of both cursors being unchanged. This is the end of the process.

Figure 7:
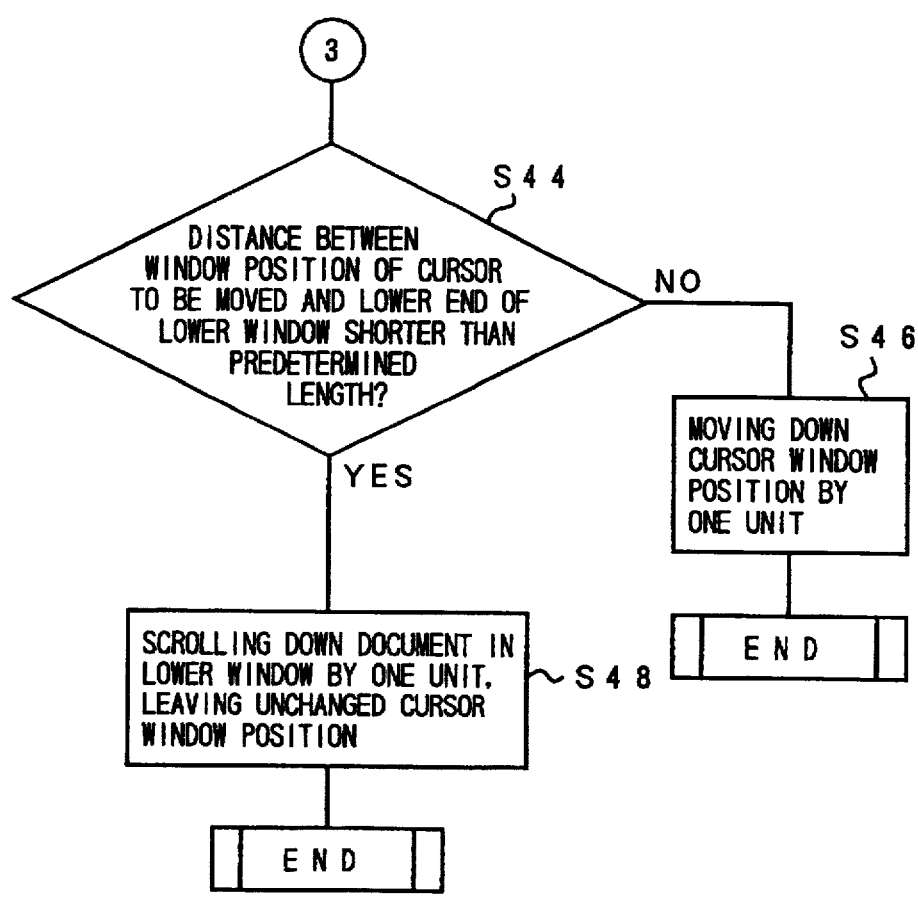

In FIG. 7, it is determined at step S44 whether the distance between the vertical window position of the cursor to be moved and the lower end of the lower window is shorter than a predetermined length (e.g., 1). If it is not, the vertical window position of the cursor to be moved is moved down at step S46 by one vertical unit. This is the end of the process. If it is shorter, the document of the lower window is scrolled down at step S48 by one vertical unit, leaving unchanged the vertical window position of the cursor to be moved. This is the end of the process.

Figure 8:
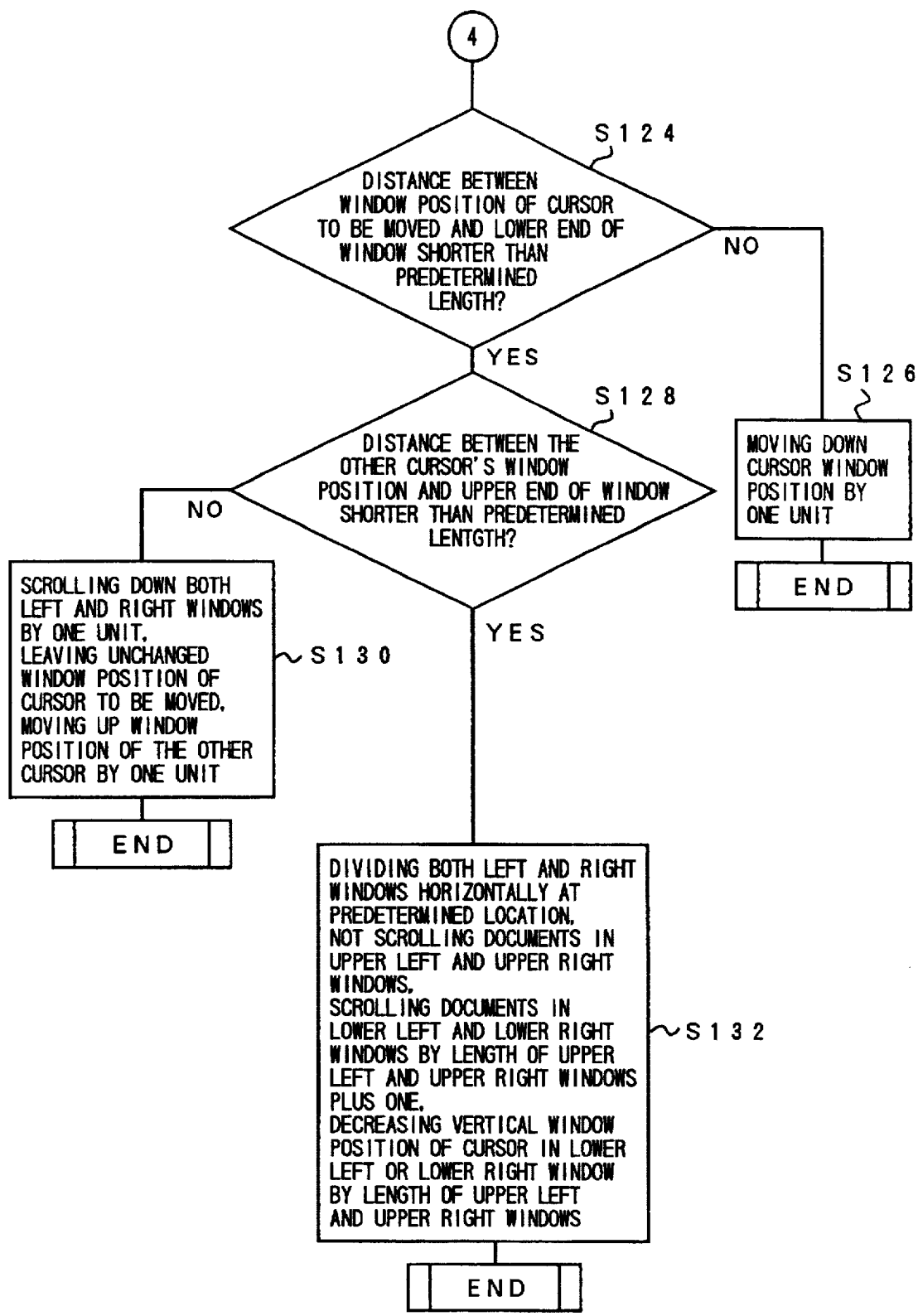

In FIG. 8, it is determined at step S124 whether the distance between the vertical window position of the cursor to be moved and the lower end of both windows is shorter than a predetermined length (e.g., 1). If it is not, the vertical window position of the cursor to be moved is moved down at step S126 by one vertical unit. This is the end of the process. If it is shorter, it is determined at step S128 whether the distance between the vertical window position of the other cursor staying still and the upper end of both windows is shorter than a predetermined length. If it is not, the documents of both left and right windows are scrolled down at step S130 by one vertical unit, leaving unchanged the vertical window position of the cursor to be moved. At the same time, the vertical window position of the other cursor is moved up by one vertical unit, and this is the end of the process.

If the distance is determined as shorter at step S128, step S132 ensues. Here, both left window and right window are divided horizontally at a predetermined location (e.g., the center of the window). Both upper windows are not scrolled, and both lower windows are scrolled by the length of the upper windows plus one so as to appear to scroll by only one vertical unit. At the same time, the vertical window position of the cursor in either one of the lower windows is decreased by the length of the upper windows, with the position on the screen of both cursors being unchanged. This is the end of the process.

Figure 9:
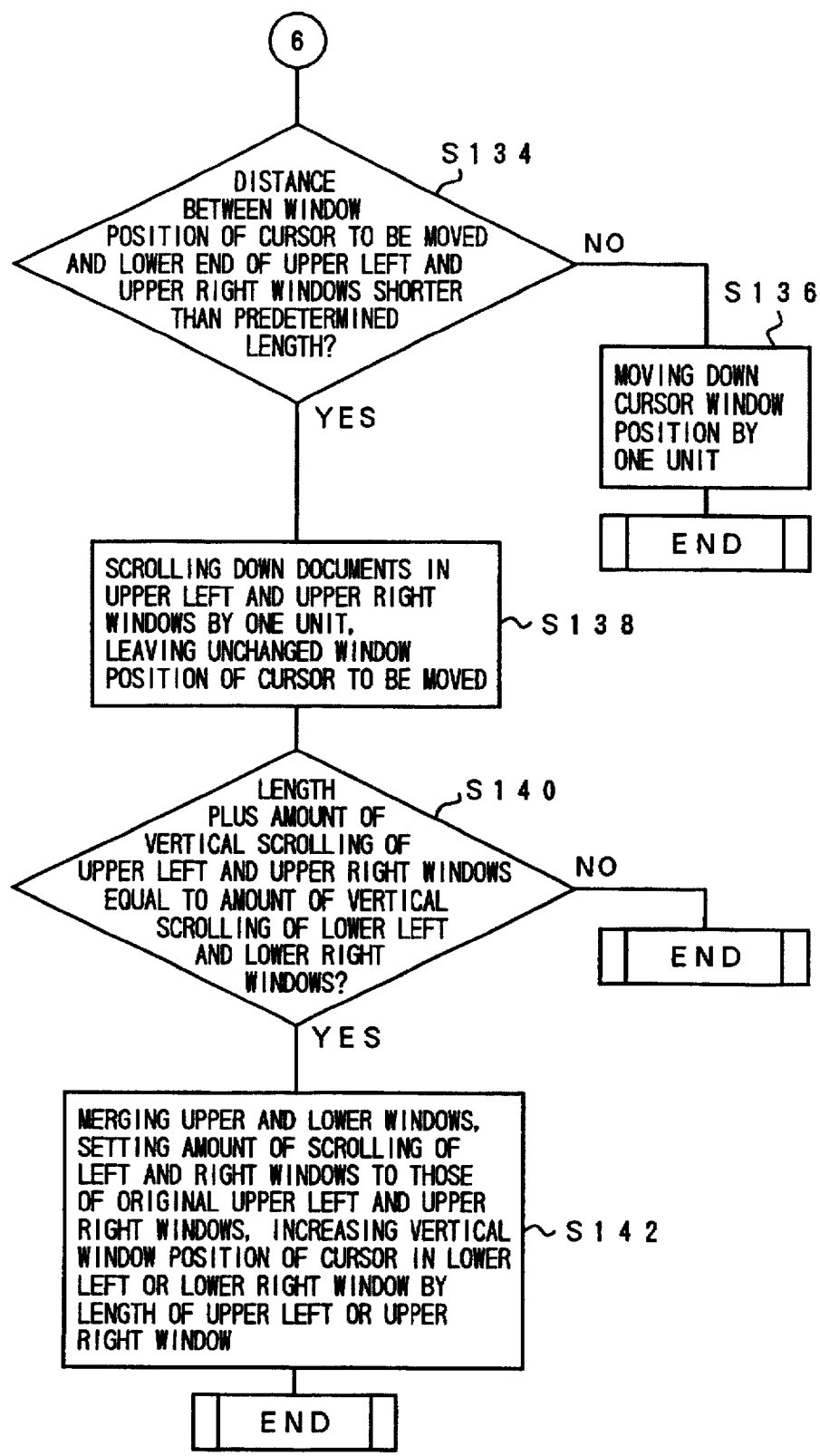

In FIG. 9, it is determined at step S124 whether the distance between the vertical window position of the cursor to be moved and the lower end of the upper windows is shorter than a predetermined length (e.g., 1). If it is not shorter, the vertical window position of the cursor to be moved is moved down at step S136 by one vertical unit. This is the end of the process. If it is shorter, the documents of both upper windows are scrolled down at step S138 by one vertical unit, leaving unchanged the vertical window position of the cursor to be moved.

Then, it is determined at step S140 whether the length plus the amount of vertical scrolling of both upper windows is equal to the amount of scrolling of both lower windows. If it is not, this is the end of the process. If it is, the horizontal division of the window into two is finished. Then, the amounts of scrolling of both left and right windows are set to those of both previous upper left and upper right windows, respectively. At the same time, the vertical window position of the cursor previously in either one of the lower windows is increased by the length of previously existing upper windows, leaving unchanged the positions in the screen of both cursors. This is the end of the process.

Figure 10:
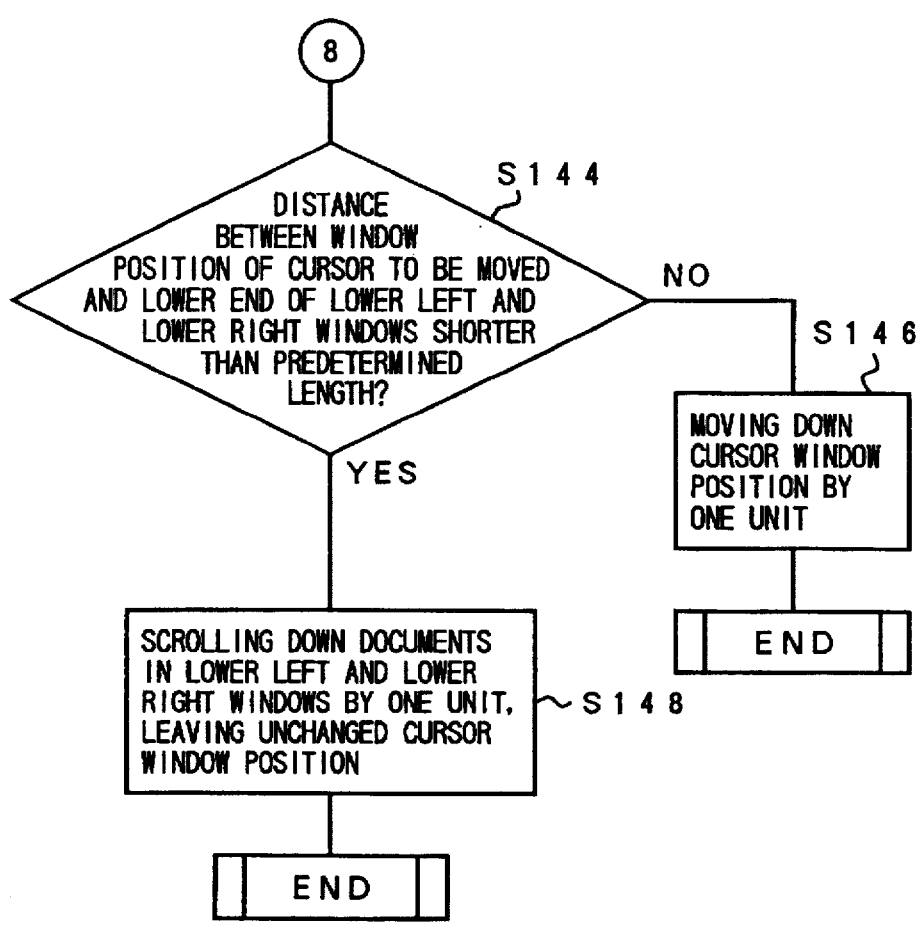

In FIG. 10, it is determined at step S144 whether the distance between the vertical window position of the cursor to be moved and the lower end of both lower windows is shorter than a predetermined length (e.g., 1). If it is not shorter, the vertical window position of the cursor to be moved is moved down at step S146 by one vertical unit. This is the end of the process. If it is shorter, the documents of both upper windows are scrolled down at step S148 by one vertical unit, leaving unchanged the vertical window position of the cursor to be moved. This is the end of the process.

In the case of a cursor upward movement command, the processes in FIG. 4 to 10 are performed with "down" and "up" being exchanged and with a minor difference in the way of calculating the amount of scrolling.

FIG. 11 to FIG. 17 show a flow chart of the process which is carried out by display control circuit 12 when a cursor is moved to the left.

Figure 11:
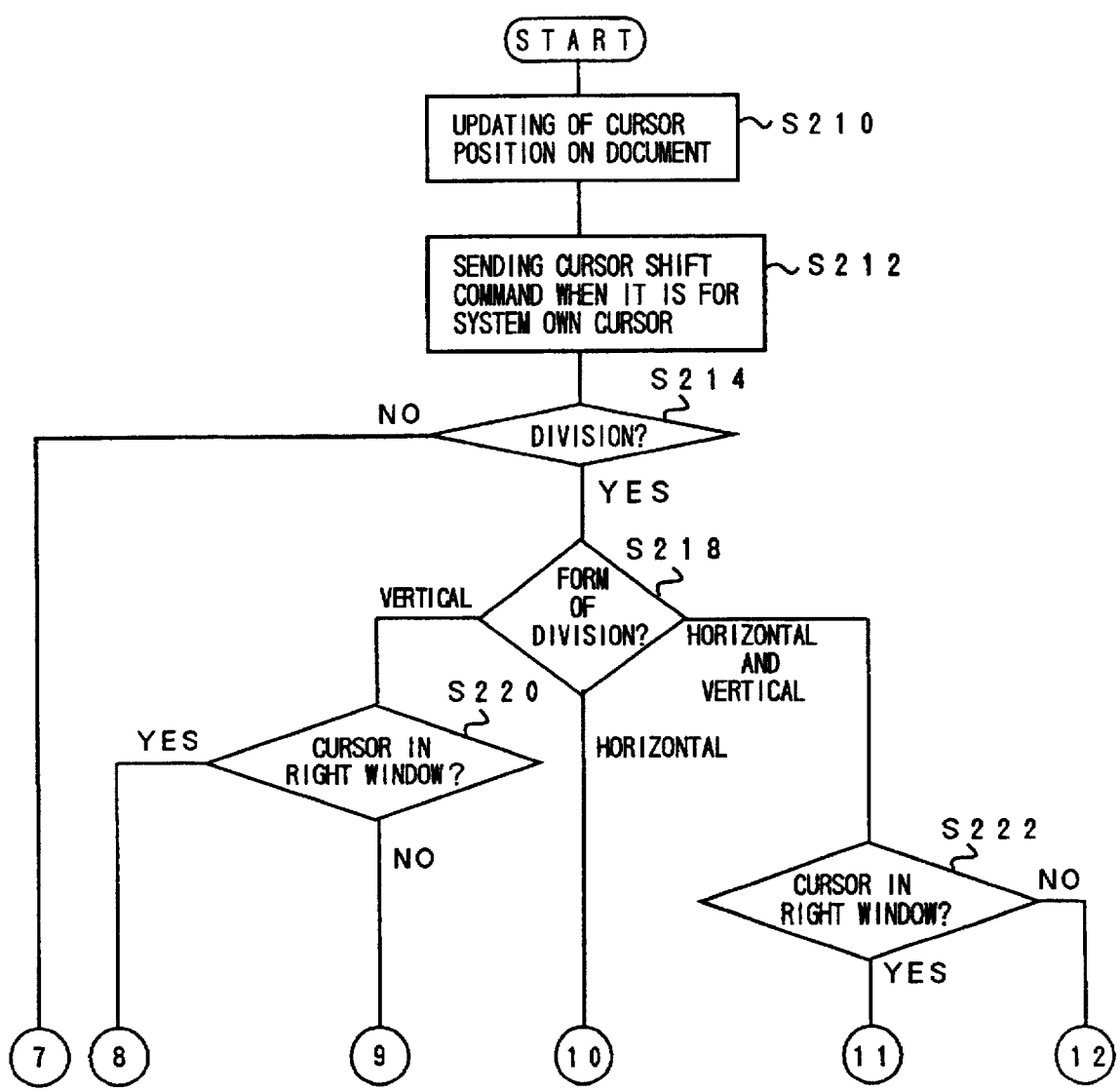
FIGS. 11, 12, 13, 14, 15, 16, and 17 are flow charts of a cursor left movement process according to the preferred embodiment of the present invention.

In FIG. 11, the position in the document of either the system terminal cursor or the other terminal cursor, depending on the given command, is updated at step S210. At step S212, the cursor movement command is sent to the other terminal through communication circuit control interface 22, only when the cursor movement command is for the system terminal cursor.

At the following steps, S214 and S218, the existence of divided windows is determined. If there is no division, the process in FIG. 12 follows, and if the window is divided vertically into two, whether the cursor to be moved is located in the right window is determined at step S220. If it is in the right window, the process in FIG. 13 ensues, and if in the left window, the process in FIG. 14 follows. Also, if the window is divided horizontally, the process in FIG. 15 follows. Furthermore, if the window is divided vertically and horizontally into four, it is determined at step S222 whether the cursor to be moved is located either in the upper right window or in the lower right window. If it is located in either of them, the process in FIG. 16 follows. If located either in the upper left or lower left window, the process in FIG. 17 follows.

Figure 12:
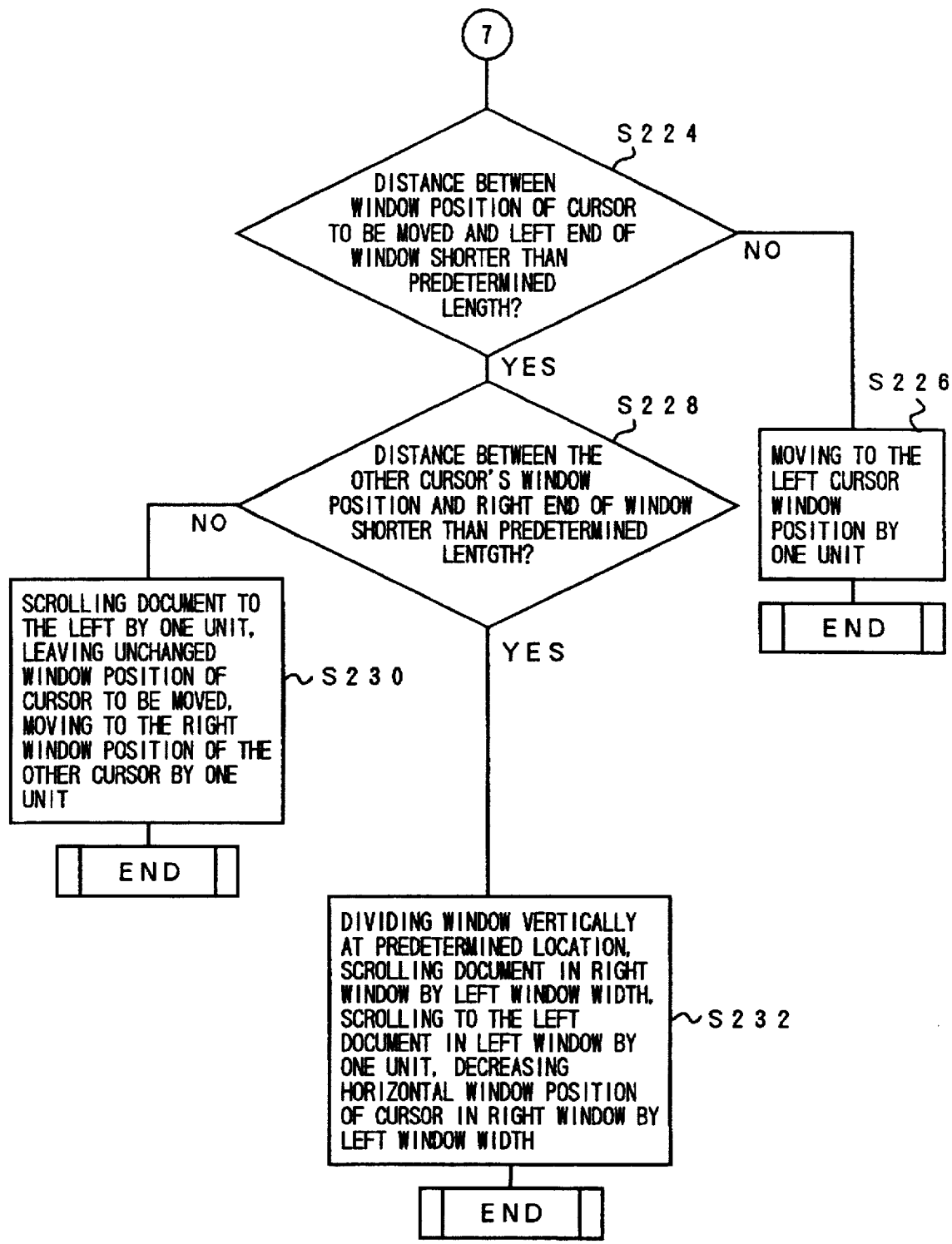

In FIG. 12, it is determined at step S224 whether the distance between the horizontal window position of the cursor to be moved and the left end of the window is shorter than a predetermined length (e.g., 1), and if it is not, the horizontal window position of the cursor to be moved is now moved to the left at step S226 by one unit of the horizontal position. This is the end of the process. On the other hand, if it is shorter, it is determined at step S228 whether the distance between the horizontal window position of the other cursor staying still and the right end of the window is shorter than a predetermined length. If it is not, the document is scrolled to the left at step S230 by one unit of the horizontal position, leaving unchanged the horizontal window position of the cursor to be moved. At the same time, the horizontal window position of the other cursor is moved to the right by one unit of the horizontal position, and this is the end of the process.

If the distance is determined to be shorter at step S228, the window is divided vertically at a predetermined location (e.g., the center of the window). Then, the document of the right window is scrolled by the amount of width of the left window so as to appear as if not scrolled, and the document of the left window is scrolled to the left by one unit of the horizontal position. At the same time, the horizontal window position of the cursor in the right window is decreased by the horizontal length of the left window, with the positions of both cursors on the screen being unchanged. This is the end of the process.

Figure 13:
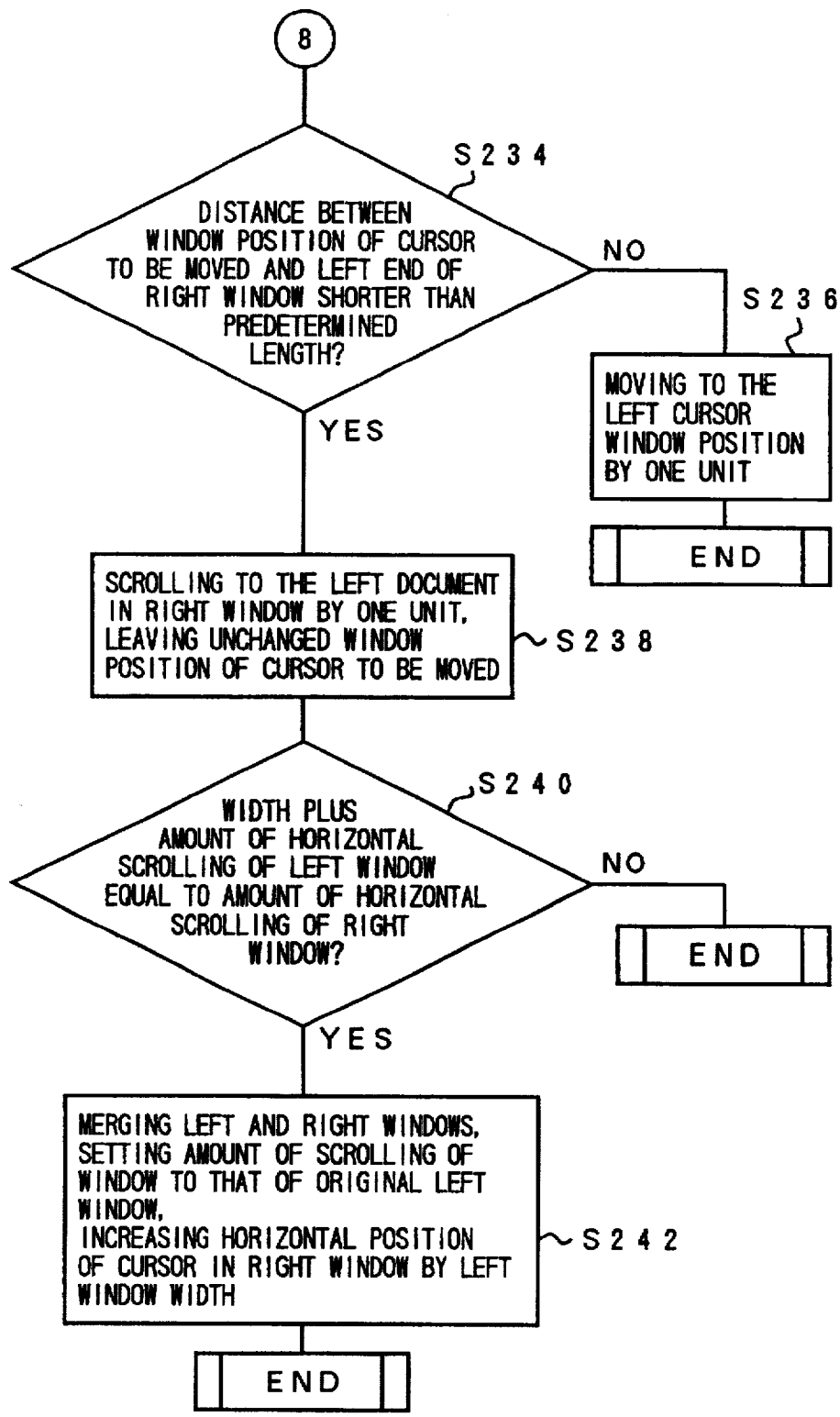

In FIG. 13, it is determined at step S234 whether the distance between the horizontal window position of the cursor to be moved and the left end of the right window is shorter than a predetermined distance (e.g., 1). If it is not shorter, the horizontal window position of the cursor is moved to the left at step S236 by one unit of the horizontal position, and this is the end of the process. If it is shorter, the document of the right window is scrolled to the left at step S238 by one unit, leaving unchanged the horizontal window position of the cursor to be moved.

Then, it is determined at step S240 whether the width plus the amount of horizontal scrolling of the left window is equal to the amount of scrolling of the right window, i.e., whether the documents of the right and left windows appear to be continuous on the screen. If it is not, this is the end of the process. If it is, the division of the window into left and right windows is finished at step S242. At the same time, the amount of scrolling of the merged window is set to that of the previous left window, and the horizontal window position of the cursor previously in the right window is increased by the width of the left window, with the positions on the screen of both cursors being unchanged. This is the end of the process.

Figure 14:
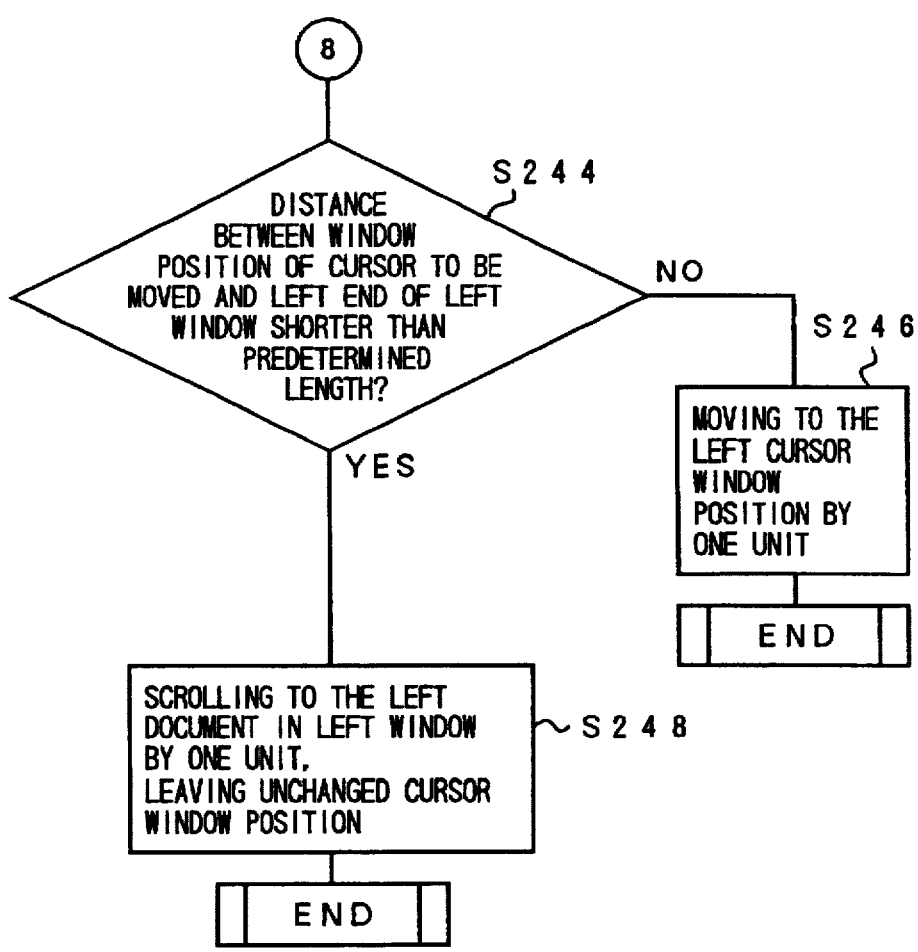

In FIG. 14, it is determined at step S244 whether the distance between the horizontal window position of the cursor to be moved and the left end of the left window is shorter than a predetermined length (e.g., 1). If it is not, the horizontal window position of the cursor to be moved is moved to the left at step S246 by one unit of the horizontal position. This is the end of the process. If it is shorter, the document of the left window is scrolled to the left at step S248 by one unit of the horizontal position, leaving unchanged the horizontal window position of the cursor to be moved. This is the end of the process.

Figure 15:
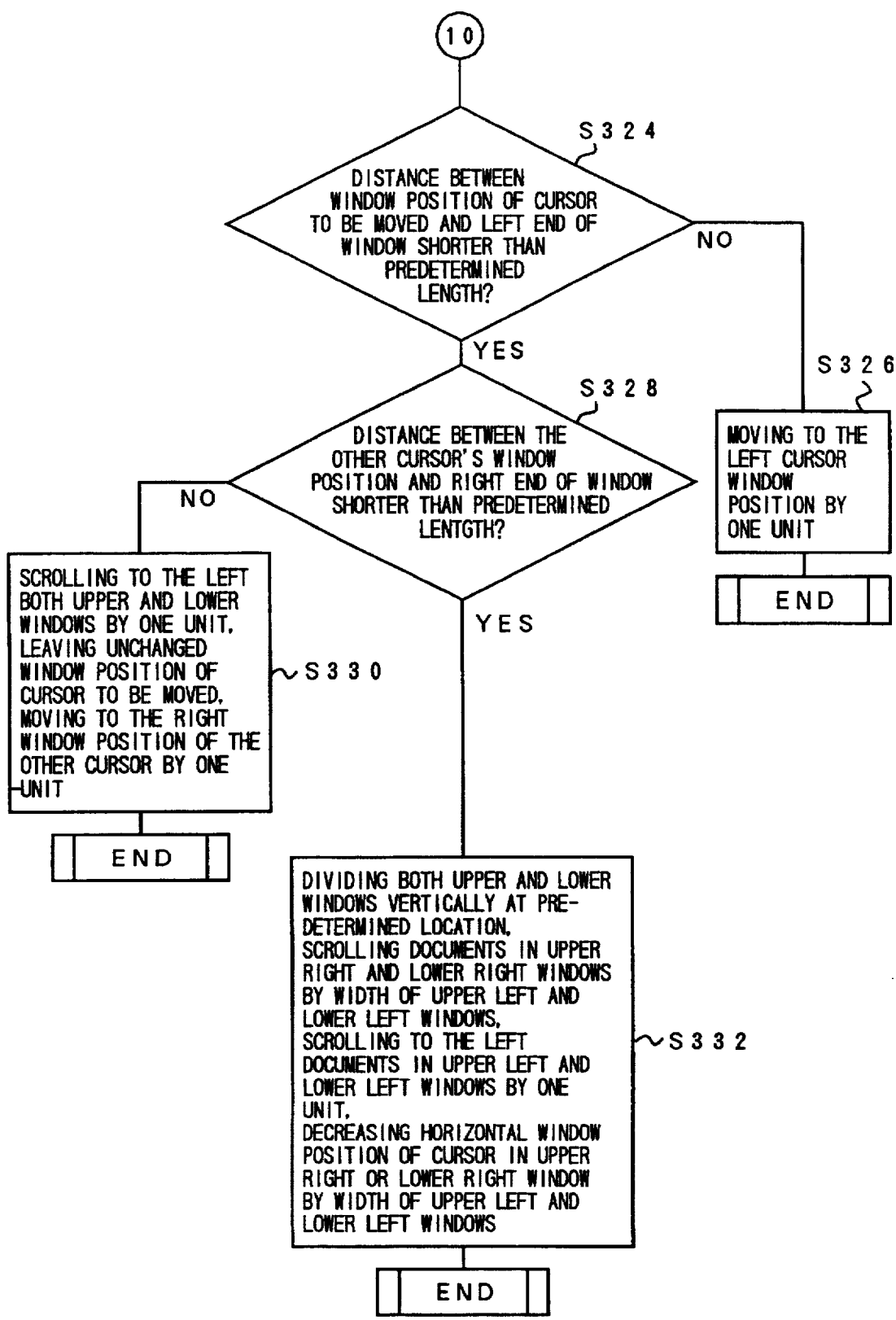

In FIG. 15, it is determined at step S324 whether the distance between the horizontal window position of the cursor to be moved and the left end of both windows is shorter than a predetermined length (e.g., 1). If it is not, the horizontal window position of the cursor to be moved is moved to the left at step S326 by one unit of the horizontal position. This is the end of the process. If it is shorter, it is determined at step S328 whether the distance between the horizontal window position of the other cursor staying still and the right end of both windows is shorter than a predetermined length. If it is not, the documents of both upper and lower windows are scrolled to the left at step S330 by one unit of the horizontal position, leaving unchanged the horizontal window position of the cursor to be moved. At the same time, the horizontal window position of the other cursor is moved to the right by one unit of the horizontal position, and this is the end of the process.

If the distance is determined as shorter at step S328, step S332 ensues. Here, both upper window and lower window are divided vertically at a predetermined location (e.g., the center of the window). Both right windows are scrolled by the width of the left windows so as to appear as if not scrolling, and both left windows are scrolled to the left by one unit of the horizontal position. At the same time, the horizontal window position of the cursor in either one of the right windows is decreased by the width of the left windows, with the position on the screen of both cursors being unchanged. This is the end of the process.

Figure 16:
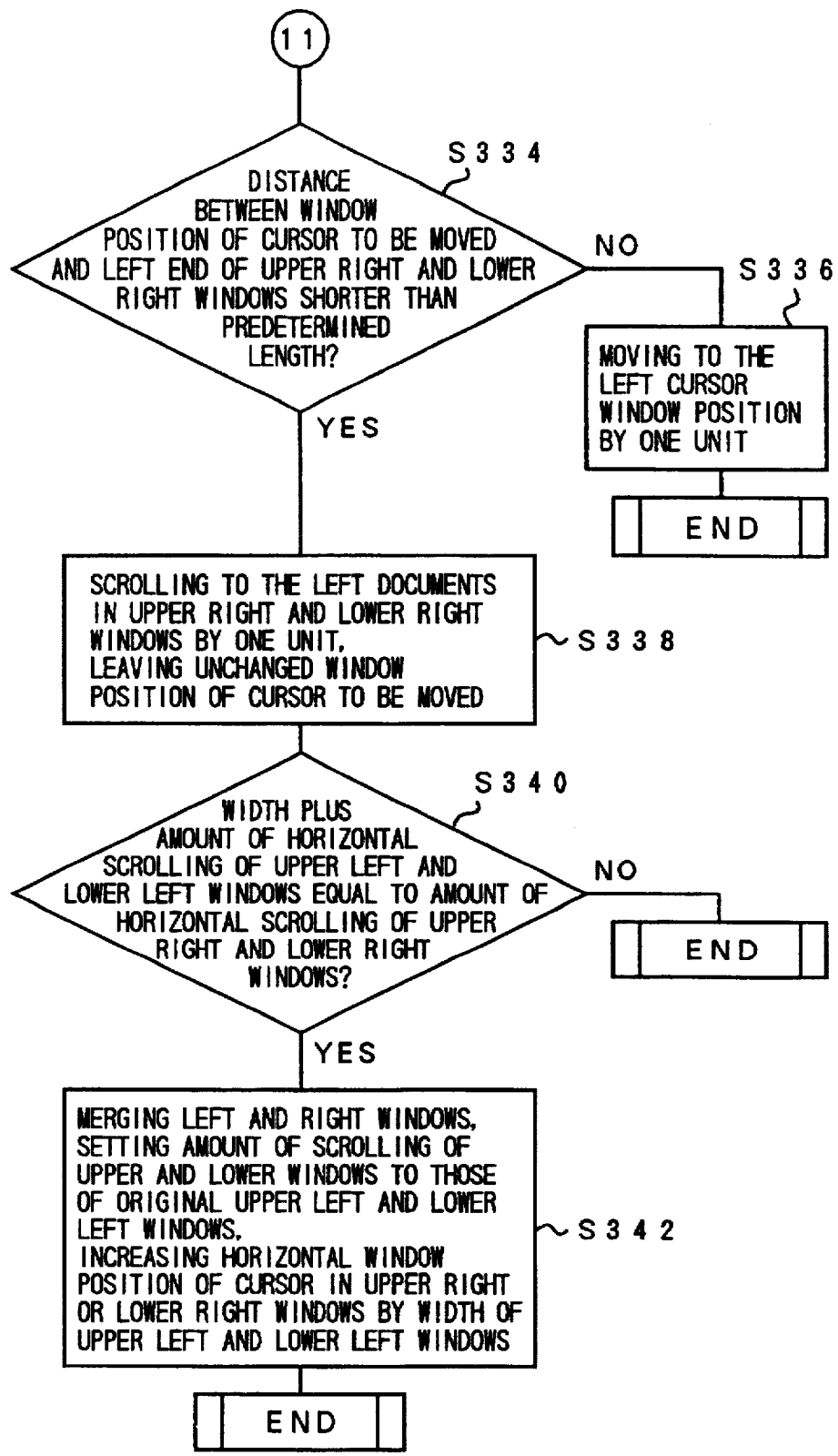

In FIG. 16, it is determined at step S334 whether the distance between the horizontal window position of the cursor to be moved and the left end of the right windows is shorter than a predetermined length (e.g., 1). If it is not shorter, the horizontal window position of the cursor to be moved is moved to the left at step S336 by one unit of the horizontal position. This is the end of the process. If it is shorter, the documents of both right windows are scrolled to the left at step S338 by one unit of the horizontal position, leaving unchanged the horizontal window position of the cursor to be moved.

Then, it is determined at step S340 whether the width plus the amount of horizontal scrolling of both left windows is equal to the amount of scrolling of both right windows, i.e., whether the documents appear to be continuous across the vertical line of division. If it is not, this is the end of the process. If it is, the vertical division of the window into two is finished. Then, the amounts of scrolling of both upper and lower windows are set to those of the previous upper left and lower left windows, respectively. At the same time, the horizontal window position of the cursor previously in either one of the right windows is increased by the width of the left windows previously existed, leaving unchanged the positions in the screen of both cursors. This is the end of the process.

Figure 17:
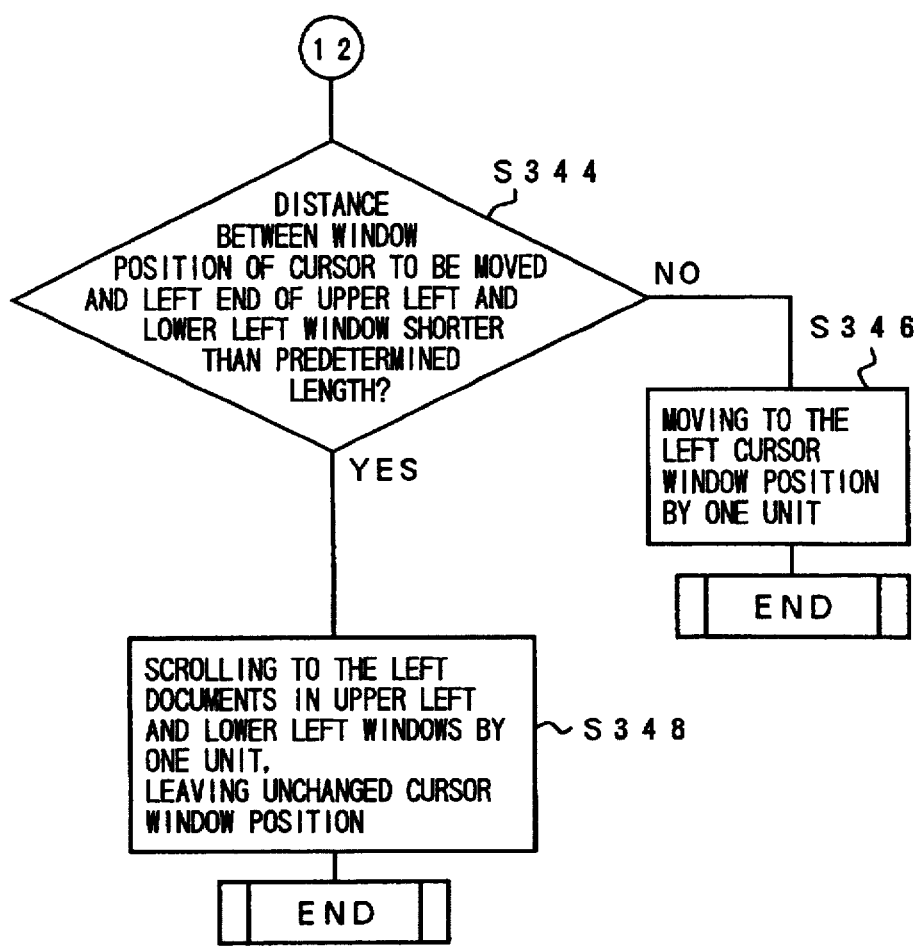

In FIG. 17, it is determined at step S344 whether the distance between the horizontal window position of the cursor to be moved and the left end of both left windows is shorter than a predetermined length (e.g., 1). If it is not shorter, the horizontal window position of the cursor to be moved is moved to the left at step S346 by one unit of the horizontal position. This is the end of the process. If it is shorter, the documents of both left windows are scrolled to the left at step S348 by one unit of the horizontal position, leaving unchanged the horizontal window position of the cursor to be moved. This is the end of the process.

In the case of a cursor right movement command, the processes in FIG. 11 to 17 are performed with "right" and "left" being exchanged and with a minor difference in the way of calculating the amount of scrolling.

Figure 18:
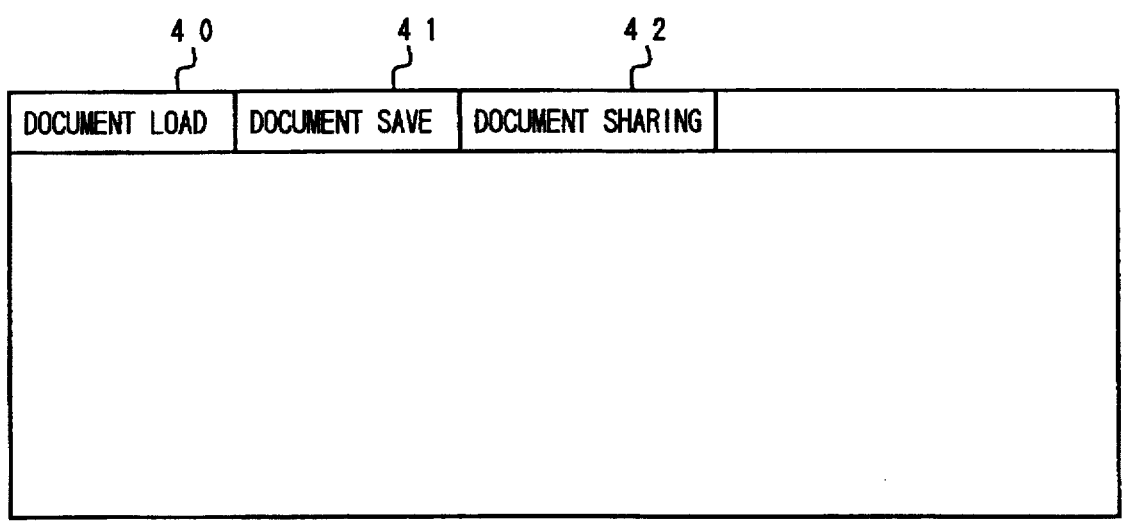
FIG. 18 shows an example of a screen display according to the present invention.

FIG. 18 shows an initial screen on display 13. Here, document load icon 40, document save icon 41, and document sharing icon 42 are displayed. Upon a click on icon 40 with mouse 16, a selected document appears on the screen. Upon a click on icon 41, the document on the screen is saved with a title of choice. Icon 42 functions as a toggle switch. In the unshared document mode, clicking icon 42 newly establishes a data communication with a terminal with which a verbal communication has been active. Then, the document on the screen is sent to that terminal, and the shared document mode is activated. When there is no document displayed on the screen, a new shared document is created. In the shared document mode, on the other hand, clicking icon 42 terminates the data communication.

With the connection of a communication line from the user A terminal to the user B terminal, upon a click on icon 42 by user A while the screen is showing a document of choice, the shared document mode is activated and the screen of the user A terminal appears as shown in FIG. 19A. In FIG. 19A, 45A is the screen for user A, and 45B for user B. Here, a hatched rectangle is user A's cursor, and an open rectangle user B's. When a cursor downward movement command is received from the keyboard 15, the documents on both screens, 45A and 45B, are scrolled down because user A's cursor is located at the bottom. At the same time, user B's cursor is moved up by one unit, and the resulting screens are shown in FIG. 19B.

When user A tries to move down user A's cursor while user B's cursor is located at the top of the screen, as shown in FIG. 20A, user A's cursor stays at the same location and the document is scrolled down on the screen 45A. At the same time, the document on the screen 45B is scrolled down.

However, since user B's cursor can not move further up, both windows are horizontally divided as shown in FIG. 20B.

As shown in FIG. 21A, when user A enters a cursor right movement command while the window is divided horizontally into two, both upper and lower windows on screen 45A and 45B are scrolled to the right as shown in FIG. 21B. This is because user A's cursor is located at the right end and user B's cursor in the upper window. The reason for scrolling both upper and lower windows is that the merging of the two windows at the time of finishing the division can be smoothly carried out by doing so. However, an alternative is that only the lower window is scrolled to the right in this case shown in FIG. 20A, and the lower window can be scrolled back to the left at the time of merging the windows.

As shown in FIG. 22A, when user A enters a cursor right movement command while the window is divided horizontally into two, the windows are divided further into four since user B's cursor is located at the left end of the upper window. The lower left window and the upper left window which includes user B's cursor are not scrolled, and the upper right and lower right windows are scrolled to the right. The resulting screens are shown in FIG. 22B.

As shown in FIG. 23A, when user A enters a cursor up movement command while the window is divided horizontally into two, the lower window is scrolled up by one vertical unit since the user A's cursor is located at the upper end of the lower window. Here, the length plus the amount of vertical scrolling of the upper window equals the amount of vertical scrolling of the lower window. Thus, the horizontal division of the window is finished, and the upper and lower windows are merged into one, resulting in the screens shown in FIG. 23B.

Further, the present invention is not limited to specifically described embodiments, but various variations and modifications may be made without departing from the scope of the present invention.

What is claimed is:

1. A shared document display system for allowing a plurality of users to edit a document in a window showing said document on at least one display, said shared document display system comprising:

cursor movement means for moving a plurality of cursors within said window according to cursor movement commands given by said users, wherein each of said cursors belongs to a corresponding one of said users;

scrolling means for scrolling said document according to a movement of one of said cursors so as to keep said one of said cursors from moving out of said window when said one of said cursors changes a position thereof in said document while being positioned in a proximity of an edge of said window, wherein the other of said cursors staying at the same position in said document moves in said window by following a scrolling of said document; and dividing means for automatically dividing said window into a plurality of divided windows wherein a first one of said divided windows including said one of said cursors keeps scrolling according said movement of said one of said cursors, while a second one of said divided windows stops scrolling such that said other of said cursors staying at the same position in said document stays in said second one of said divided window.

2. The shared document display system as claimed in claim 1, wherein said dividing means comprises means for dividing said window into said divided windows showing divided views of said document arranged along a scrolling direction when scrolling of said document caused by said one of said cursors changing said position thereof in said document results in a distance between said other of said cursors and one end of said window being shorter than a predetermined length, said end being opposite to said edge.

3. The shared document display system as claimed in claim 2, further comprising merging means for merging said divided windows under circumstances of existence of said divided windows when a scrolling of one of said divided views of said document results in joining of said divided views shown in said divided windows.

4. The shared document display system as claimed in claim 3, wherein said dividing means divides said window into two windows such that said window is divided by a horizontal line when said scrolling direction is a vertical direction.

5. The shared document display system as claimed in claim 4, wherein said merging means merges said two windows when a scrolling of one of said divided views of said document results in joining of said divided views shown in said two windows.

6. The shared document display system as claimed in claim 4, wherein said dividing means divides each of said two windows into further two windows such that said window is divided into four windows by said horizontal line and a vertical line, in order to show all of said cursors within said window when one of said cursors moving a position thereof in said document causes a horizontal scrolling of both of said divided views shown in said two windows.

7. The shared document display system as claimed in claim 6, wherein said merging means merges said four windows into two windows when said divided views of said document shown in said four windows are joined across one of said horizontal line and said vertical line.

8. The shared document display system as claimed in claim 3, wherein said dividing means divides said window into two windows such that said window is divided by a vertical line when said scrolling direction is a horizontal direction.

9. The shared document display system as claimed in claim 8, wherein said merging means merges said two windows when a scrolling of one of said divided views of said document results in joining of said divided views shown in said two windows.

10. The shared document display system as claimed in claim 8, wherein said dividing means divides each of said two windows into further two windows such that said window is divided into four windows by said vertical line and a horizontal line, in order to show all of said cursors within said window when one of said cursors moving a position thereof in said document causes a vertical scrolling of both of said divided views show in said two windows.

11. The shared document display system as claimed in claim 10, wherein said merging means merges said four windows into two windows when said divided views of said document shown in said four windows are joined across one of said horizontal line and said vertical line.

12. The shared document display system as claimed in claim 1, further comprising a plurality of terminals connected to each other, each of said terminals receiving said cursor movement commands from a corresponding one of said users and including a display to show said window.

* * * * *